United States Patent [19]

Weldon et al.

[11] 4,405,965

[45] Sep. 20, 1983

[54] CURRENT LIMITING DEVICE FOR OVERCURRENT PROTECTION

[75] Inventors: William F. Weldon; Herbert H. Woodson, both of Austin, Tex.

[73] Assignee: Board of Regents, University of Texas System, Austin, Tex.

[21] Appl. No.: 332,445

[22] Filed: Dec. 21, 1981

[51] Int. Cl.³ .......................... H02H 9/02; H02H 9/08
[52] U.S. Cl. ........................................ 361/43; 361/58; 361/111; 361/93
[58] Field of Search ..................... 361/58, 43, 93, 111, 361/102, 4, 11, 56; 323/264, 347; 333/17 L; 336/115, 121, 129, 123

[56] References Cited

U.S. PATENT DOCUMENTS 743,887 11/1903 Kitsee ................................. 323/264
3,209,114 9/1965 McBrien ....................... 336/129 X

FOREIGN PATENT DOCUMENTS 1223386 2/1971 United Kingdom ............... 336/129

Primary Examiner—Reinhard J. Eisenzopf
Attorney, Agent, or Firm—Arnold, White & Durkee

[57] ABSTRACT

A current limiting device for use with a circuit breaker in an electric power system utilizes mutual inductance variation between movable windings to limit current to safe levels. In the device, first and second coil windings are electrically connected for current flow therethrough and magnetically linked for mutual inductive coupling. The effective inductance of the connected coil windings is functionally related to the relative physical positioning of the coil windings. The coil windings are movable relative to one another, so as to provide for variation in the effective inductance of the two coils. Structure is provided for disposing the coils in an initial relative positioning, the structure being yieldable to a force produced between the coils due to a predetermined magnitude of current flow through the coils. The force produced between the coils acts to change the relative positioning of the coils, increasing the effective inductance, and thereby limiting the current therethrough. In an alternative arrangement, movement of the coils to designated positions of relative placement due to a predetermined magnitude of current flow therethrough may be utilized to open a set of electrical contacts or to trigger a conventional circuit breaker interrupting the circuit.

7 Claims, 5 Drawing Figures

CURRENT LIMITING DEVICE FOR OVERCURRENT PROTECTION

BACKGROUND OF THE INVENTION

The present invention relates to current limiting devices for electrical power systems.

In electric power systems, generation, transmission and distribution equipment must be protected from overloads due to currents above safe levels. Such protection is normally provided by circuit breaker devices comprising electrical contacts and means for actuating the contacts upon detection of excessive current. Conventional circuit breaker devices, however, have limitations on the fault current they can interrupt. Hence in many applications, fault current limiting is needed so as not to exceed the ratings of breakers.

Other types of current limiting devices have been proposed. Among these are nonlinear resistance devices utilizing pressurized mercury and conductive ceramics. These devices have not, however, been adopted into general use.

Accordingly, there remains a need for an improved current limiting device for use with or in lieu of circuit breakers in electric power systems.

SUMMARY OF THE INVENTION

In accordance with the present invention, a current limiting device for overcurrent protection in an electric power system utilizes the principle of mutual inductance variation between movable windings. Generally in accordance with the present invention, two connected coils (either in series or in parallel) are positioned in close physical proximity to one another so as to be magnetically-coupled. The initial position is established by suitable means for biasing the coils into a position of reduced total effective inductance. Current from an AC source to a load is directed through the connected coils. The current flow generates a force which tends to drive the coils into a position of increased total effective inductance. At rated current levels, this force is resisted by the biasing means. As the current increases above rated level, the biasing means yields to the force, permitting relative movement between the coupled coils. The total effective inductance of the device increases, thereby limiting the current.

The current limiting device of the present invention can be constructed in a variety of geometries, including linear and rotational configurations. Furthermore, by appropriately designing the inductance variation as a function of coil position, a wide variety of inductance versus current and current rise time characteristics are attainable.

The current limiting device of the present invention is suitable for use in both single phase and multiphase power systems. In a multiphase power system, multiphase windings can be used in the device, or multiple single-phase current limiting devices could be mechanically ganged. The choice for any particular power system will, of course, depend upon the nature of the current limiting action desired.

The means for positioning the coils and yieldably resisting force produced between the coils may suitably be provided by a mechanical, hydraulic or pneumatic device. For example, a spring could be utilized.

If desired for a particular application, movement of the coils to designated positions of relative placement due to a predetermined magnitude of current flow therethrough may be utilized to open a set of contacts or to trigger a conventional circuit breaker.

BRIEF DESCRIPTION OF THE DRAWINGS

A written description setting forth the best mode presently known for carrying out the present invention, and of the manner of implementing and using it, is provided by the following detailed description of preferred embodiments which are illustrated in the attached drawings wherein.

DETAILED DESCRIPTION OF ILLUSTRATIVE EMBODIMENTS

Figure 1:
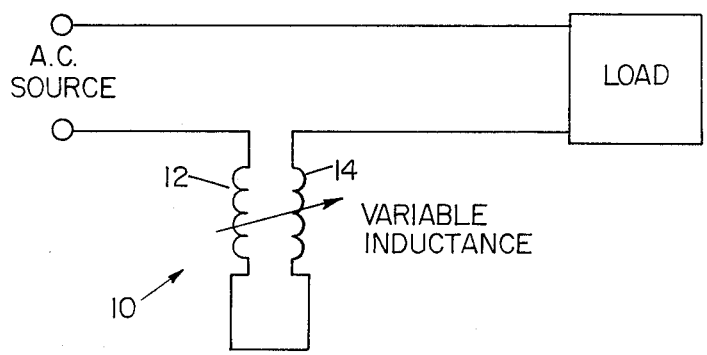
FIG. 1 is a schematic diagram of a power system utilizing therein a current limiting device in accordance with the present invention which is in a series-connected coils embodiment.

Referring to FIG. 1, an electrical power system including an AC source and a load is shown. For protection of the generation, transmission and distribution equipment supplying electrical power to the load, as well as protecting the load itself, a current limiting device 10 in accordance with the present invention is interconnected between the AC source and the load. The current limiting device exhibits a variable inductance depending upon the level of current flow through the device.

Current limiting device 10 includes first and second coil windings 12 and 14. The coil windings are electrically connected in series, and magnetically linked for mutual inductive coupling. Also, windings 12 and 14 are movable with respect to one another. The relative positioning of the coils is initially established by some form of positioning means not shown in the drawing figure. The positioning means yields to movement of the coils produced by a force developed by current passing through the coupled coil windings. As the relative positioning of the coil windings changes, the effective inductance of the connected windings also changes.

In operation, the coil windings of device 10 are initially positioned very near one another, but not at the minimum inductance position. Current from the AC source to the load passes through the connected and coupled coil windings, thereby generating a force which tends to drive the coils into a position of maximum total inductance. The positioning means provides a restraining force which resists the force produced by current flow until the current flow exceeds rated or other predetermined current levels. As the current increases above rated level, the positioning means yields, permitting relative movement between the coil windings so as to increase the inductance of the device. As the inductance of the device increases, there is a limiting effect on the magnitude of the current.

Figure 2:
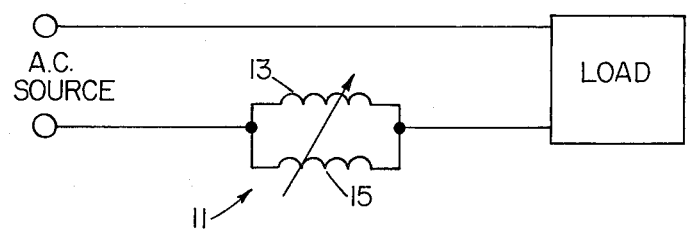
FIG. 2 is a schematic diagram of a power system utilizing therein a current limiting device in accordance with the present invention which is in a parallel-connected coils embodiment.

Referring to FIG. 2, an alternate embodiment of a current limiting device in accordance with the present invention is shown in an electrical power system including an AC source and a load. The current limiting device is interconnected between the AC source and the load.

Current limiting device 11 includes first and second coil windings 13 and 15. The coil windings are electrically connected in parallel, and magnetically linked for mutual inductive coupling. Also, windings 13 and 15 are movable with respect to one another. The relative positioning of the coils is initially established by some form of positioning means not shown in the drawing figure. The positioning means yields to movement of the coils produced by a force developed by current passing through the coupled coil windings. As the relative positioning of the coil windings changes, the effective inductance of the connected windings also changes.

Operation of device 11 is similar to that of device 10. The coil windings of device 11 are initially positioned very near one another, but not at the minimum inductance position. Current from the AC source to the load passes through the connected and coupled coil windings, thereby generating a force which tends to drive the coils into a position of maximum total inductance. The positioning means provides a restraining force which resists the force produced by current flow until the current flow exceeds rated or other predetermined current levels. As the current increases above rated level, the positioning means yields, permitting relative movement between the coil windings so as to increase the inductance of the device. As the inductance of the device increases, there is a limiting effect on the magnitude of the current.

The parallel-connected coils embodiment shown in FIG. 2 has a lower impedance than the series-connected coils embodiment shown in FIG. 1. However, the maximum attainable effective inductance value is less than that of the series-connected coils embodiment. The total variation or change in inductance value is the same for both devices.

Figure 3:
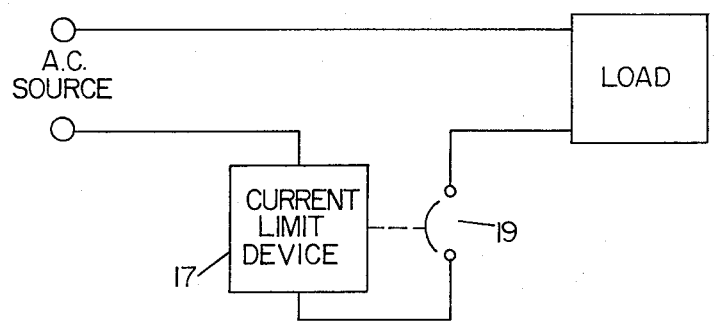
FIG. 3 is a schematic diagram of a power system utilizing therein a current limiting device in accordance with the present invention to activate a set of circuit breaker contacts.

Although a suitable manner of operation of an electrical power system utilizing a current limiting device in accordance with the present invention involves only the use of the current limiting device for protection, if desired for a particular application, the current limiting device may be utilized to open a set of contacts, or to trigger a conventional circuit breaker, for interrupting current flow through the power system. Such an arrangement is diagrammed in FIG. 3, where an electrical power system including an AC source and a load includes a current limiting device 17 and a set of breaker contacts 19. In FIG. 3, current limiting device 17 is generally indicated by a functional block. It is to be understood that either the series-connected coils embodiment of FIG. 1 or the parallel-connected coils embodiment of FIG. 2 may be utilized in the arrangement of FIG. 3 for current limiting device 17.

In the diagram of FIG. 3, current limiting device 17 is connected in series with contacts 19. Operation of current limiting device 17 proceeds as described in connection with the embodiments of FIGS. 1 and 2; however, in addition, movement of the coils to designated positions of relative placement due to a predetermined magnitude of current flow therethrough is utilized to open contacts 19, thereby interrupting current flow to the load.

Figure 4:
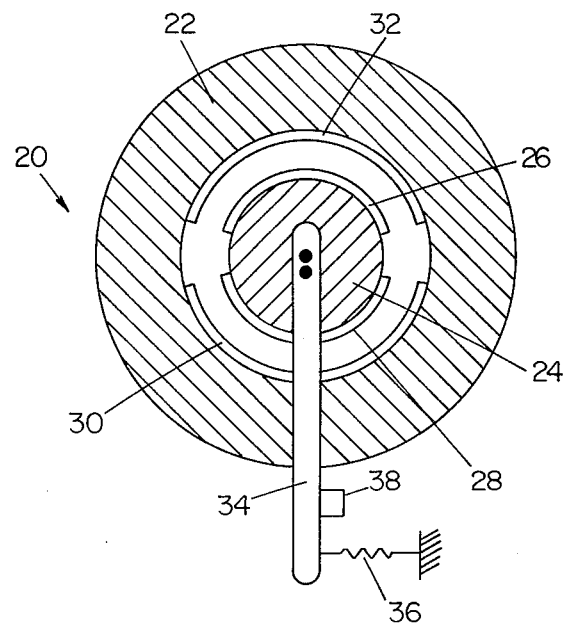
FIG. 4 is a diagram of a current limiting device in accordance with the present invention in a rotary configuration.
Figure 5:
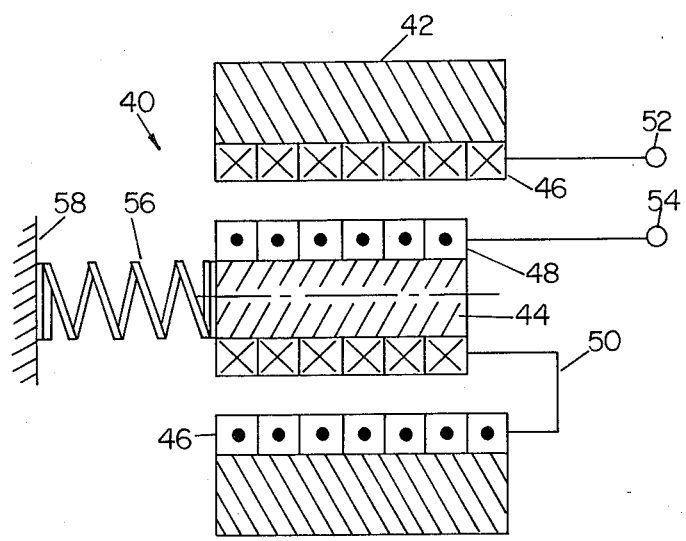
FIG. 5 is a diagram of a current limiting device in accordance with the present invention in a linear configuration.

As shown in FIGS. 4 and 5, the current limiting devices 10 and 11 can be constructed in a variety of geometries. In FIG. 4, a rotational geometry device is diagrammed. In FIG. 5, a linear geometry device is diagrammed. In both diagram representations, the positioning means is indicated as being a spring device. Suitably, the positioning means may comprise a mechanical, hydraulic or pneumatic spring device. Also, it will be appreciated that by selecting the force resistance and yield characteristics of the positioning means, various inductance versus current and current rise time characteristics can be implemented. Also, device characteristics can be varied by design selection of the inductance variation as a function of relative coil windings positioning.

Referring specifically to FIG. 4, rotary current limiting device 20 includes a stator 22 and a rotor 24. Both the stator and the rotor can be constructed of laminated steel. Both the stator and the rotor carry windings. As diagrammed in FIG. 4, the portion of the rotor winding for in-flowing current is referenced by numeral 26, and the portion of the rotor winding for out-flowing current is referenced by numeral 28. In a similar manner, the stator winding has an in-flowing current portion referenced by numeral 30, and an out-flowing current portion referenced by numeral 32.

The positioning means utilized in rotary current limiting device 20 comprises a torque arm 34 connected to rotor 24 and a spring 36 connected thereto for applying a counterclockwise biasing force to the torque arm. Initial positioning of the coils is established by a locating stop 38 against which torque arm 34 abuts.

The number of winding turns and the number of poles are not critical and can be chosen as desired. However, a two-pole configuration is recommended. The rotary and stationary windings may be electrically connected by means of sliding contacts or flexible leads since maximum rotation will be limited to one pole pitch. The windings may be cooled to remove dissipation losses by, for example, passage of liquid or gas through tubes within the winding, or by passing coolant through the air-gap between the rotor and stator.

Referring now to FIG. 5, a linear current limiting device 40 includes a stator solenoid 42 and a moving solenoid 44. The stator solenoid includes a stator solenoid winding 46. Similarly, the moving solenoid includes a moving solenoid winding 48. An electrical connection 50 is established between the stator solenoid winding and the moving solenoid winding. External connection is made available by terminals 52 and 54 electrically connected to the stator and moving solenoid windings, respectively.

Positioning means is provided in the form of spring 56 which is connected to a spring mount 58 and applies a yieldable restraining force to the moving solenoid.

In use of the current limiting devices shown in FIG. 4 and 5 in a system as diagrammed in FIG. 3, the positioning means may further be utilized as a means to either directly open the contacts or to trigger a conventional circuit breaker.

The foregoing description of the invention has been directed to particular embodiments for purposes of explanation and illustration. It will be apparent, however, to those skilled in this art that many modifications and changes in the structure of the illustrated embodiments may be made without departing from the essence of the invention. For example, while a single-phase device is indicated by the illustrative embodiments, it is contemplated that current limiting devices in accordance with the present invention can be utilized in multiphase power systems. In such application, multiphase windings could be used, or multiple single-phase devices could be mechanically ganged together. Also, individual single-phase devices could be used on each phase of the multiphase power system. The choice for any particular system will depend upon the nature of the current limiting action desired. For example, if a single-phase fault occurs at a multiphase system, individual single-phase current limiting devices would limit current in the shorted phase only. A multiphase device would act on all phases simultaneously. These, and other modifications and uses of the illustrated embodiments, as well as other embodiments of the invention, will be apparent to those skilled in this art. It is the Applicants' intention in the following claims to cover all equivalent modifications and variations as fall within the scope of the invention.

What is claimed is:

1. A current limiting device for an electric power system, comprising:
   a first coil winding;
   a second coil winding;
   said coil windings being electrically connected for current flow therethrough, and magnetically linked for mutual inductive coupling;
   said connected coil windings having an effective total inductance functionally related to their relative positioning;
   said coil windings being disposed for relative movement, so as to provide for variation in the effective total inductance;
   means for positioning said coil windings in an initial relative positioning to establish an initial effective total inductance; and
   means for resisting movement of said coil windings under a force produced between said coils due to current flow therethrough, and for yielding to movement of said coils under a force produced between said coils due to a predetermined magnitude of current through the coil windings, so as to permit a change in relative positioning of the coils which acts to limit the flow of current therethrough.

2. The device of claim 1 wherein said coil windings are electrically connected in series.

3. The device of claim 1 wherein said coil windings are electrically connected in parallel.

4. A current limiting device for an electric power system, comprising:
   a stator having a winding thereon and defining an opening;
   a rotor disposed within the opening in the stator for rotational movement relative to said stator, said rotor having a winding thereon;
   means for electrically connecting the stator winding with the rotor winding;
   means for electrical connection of the stator winding and the rotor winding to an electrical power system;
   said stator winding and said rotor winding being magnetically linked for mutual inductive coupling;
   said connected windings having an effective total inductance functionally related to the relative rotational positioning of the windings;
   means for positioning said rotor in an initial relative rotational position with respect to said stator to establish an initial effective total inductance; and
   means for resisting rotational movement of said rotor relative to said stator under a force produced between the stator winding and the rotor winding due to current flow therethrough, and for yielding to rotational movement of said rotor relative to said stator under a force produced between the windings due to a predetermined magnitude of current flowing through the windings, so as to permit a change in relative rotational positioning of the windings which acts to limit the flow of current therethrough.

5. A current limiting device for an electric power system, comprising:
   a solenoid stator having a winding thereon and defining an opening;
   a movable solenoid armature disposed within the opening in the stator for longitudinal movement therein, and having a winding thereon;
   means for electrically connecting the stator winding with the armature winding;
   means for electrical connection of the stator winding and the armature winding to an electric power system;
   said stator winding and said armature winding being magnetically linked for mutual inductive coupling;
   said connected windings having an effective total inductance functionally related to the longitudinal positioning of the armature winding relative to the stator winding;
   means for positioning said armature in an initial relative longitudinal position with respect to said stator to establish an initial effective total inductance; and
   means for resisting longitudinal movement of said armature relative to said stator under a force produced between the stator winding and the armature winding due to current flow therethrough, and for yielding to longitudinal movement of said armature relative to said stator under a force produced between the windings due to a predetermined magnitude of current flowing through the windings, so as to permit a change in relative longitudinal positioning of the windings which acts to change the total effective inductance and limit the flow of current therethrough.

6. Over-current protection apparatus for an electric power system including a source of alternating current electrical power and a load, comprising:
   a set of electrical connection contacts connectable in series with the load, for interrupting current flow to the load upon actuation; and
   means connectable in the power system between the power source and the load, for actuating said contacts,
   said means including
   a first coil winding;
   a second coil winding;
   said coil windings being electrically connected for current flow therethrough, and magnetically linked;
   said coils being disposed for relative movement under a force produced between said coils due to current flow therethrough; and
   means for sensing movement of said coils to designated relative positions due to a predetermined magnitude of current flow, and for producing a contact actuating response output.

7. Over-current protection apparatus for an electric power system including a source of alternating current electrical power and a load, comprising:
   a set of electrical connection contacts connectable in series with the load, for interrupting current flow to the load upon actuation; and
   means connectable in the power system between the power source and the load, for actuating said contacts;
   said means including
      a first coil winding;
      a second coil winding;
      said coil windings being electrically connected for current flow therethrough, and magnetically linked;
      said coil windings being disposed for relative movement under a force produced therebetween due to current flow therethrough;
   means for positioning said coil windings in an initial relative positioning; and
   means for resisting movement of said coil windings, and for yielding to movement of said coils under a force produced between said coils due to a predetermined magnitude of current through the coil windings, so as to permit a change in relative positioning of the coils which serves to actuate said contacts.

* * * * *